United States Patent [19]
Wackerly

[11] Patent Number: 5,839,768
[45] Date of Patent: Nov. 24, 1998

[54] CABLE LOOP FORMING AND HOISTING DEVICE

[76] Inventor: Gary E. Wackerly, 310 Lincoln Ave., Canton, Ohio 44708

[21] Appl. No.: 833,574

[22] Filed: Apr. 7, 1997

[51] Int. Cl.⁶ .............................. B66C 1/12; F16G 11/14
[52] U.S. Cl. ...................... 294/74; 24/115 M; 24/129 R; 294/82.11
[58] Field of Search ............................. 294/74, 75, 82.11, 294/82.14, 82.23, 82.35; 24/115 R, 115 H, 115 K, 129 R, 129 A

[56] References Cited

U.S. PATENT DOCUMENTS

| | | | |
|---|---|---|---|
| 2,592,696 | 4/1952 | Hoody | 24/129 R X |
| 2,819,923 | 1/1958 | Anderson | 294/74 |
| 3,083,993 | 4/1963 | Damm | 294/75 |
| 3,321,816 | 5/1967 | Monroe | 24/130 |
| 4,575,905 | 3/1986 | Torrey | 24/129 R |
| 4,930,193 | 6/1990 | Baker | 24/129 R |
| 5,339,498 | 8/1994 | Parsons | 24/129 R |

*Primary Examiner*—Johnny D. Cherry

[57] ABSTRACT

The present invention relates to a cable loop forming and hoisting device and, more particularly, to a cable knot block device adapted to forming a sized hoisting sling or loop in fixed relation which is capable of lifting or restraining various types and sizes of loads of varying weight. The device may be readily attached to the load and easily disconnected from the cable while positively retaining the cable in looped load-bearing locked-in relation.

10 Claims, 3 Drawing Sheets

5,839,768

CABLE LOOP FORMING AND HOISTING DEVICE

BACKGROUND OF THE INVENTION

The present invention relates to a cable loop forming and hoisting device and, more particularly, to a cable knot block device adapted to forming a sized hoisting sling or loop in fixed relation which is capable of lifting or restraining various types and sizes of loads of varying weight.

Hoisting slings are particularly valuable for lifting and moving plural grouped articles and heavy individual loads such as machines of varying size, shape, weight and configurations where the load must be moved or positively restrained against movement. U.S. Pat. No. 3,083,993 to Damm discloses an example of such device. Many forms of such slings incorporate an encompassing band and a quick-disconnect latch assembly for use with one or two hoisting cables. In some situations, the band is positioned so that the latch assembly is located at the lower circumference of the load and the ends of two hoisting cables are connected to separable members of the latch assembly and extend upwardly on opposite sides of the load.

Another example of a hoisting device to prevent the load from pitching is one comprised of U-shaped troughs located on opposite sides of the load center line. Cables have been found to slip out of the troughs of this type during hoisting.

Another object of the invention is to provide a cable knot block device which does not overtighten the cable against itself under load and does not permit slippage of the loaded cable due to the cable locking feature of the device. The matter of overtightening of the cable around the load makes disconnecting from the load difficult to achieve using other types of devices and sometimes requires cutting of the cable. The subject device does not overtighten the cable within the device itself and the load is readily able to be released from the cable as desired.

Another object of the invention is to provide a cable knot block which is capable of constant grasping and connecting of the cable to the load when tension in the cable is reduced, the cable loop remaining fully attached to the load.

A still further object of the invention is to provide a steel knot block device for a steel cable which can be readily removed from the cable and reattached as desired for a wide variety of loads, even those located in a confined space.

BRIEF DESCRIPTION OF THE DRAWINGS

Further objects and advantages of this invention will appear in the specification hereinbelow, and the invention is illustrated in the accompanying drawings in which.

DETAILED DESCRIPTION OF THE PREFERRED EMBODIMENT

Figure 1:
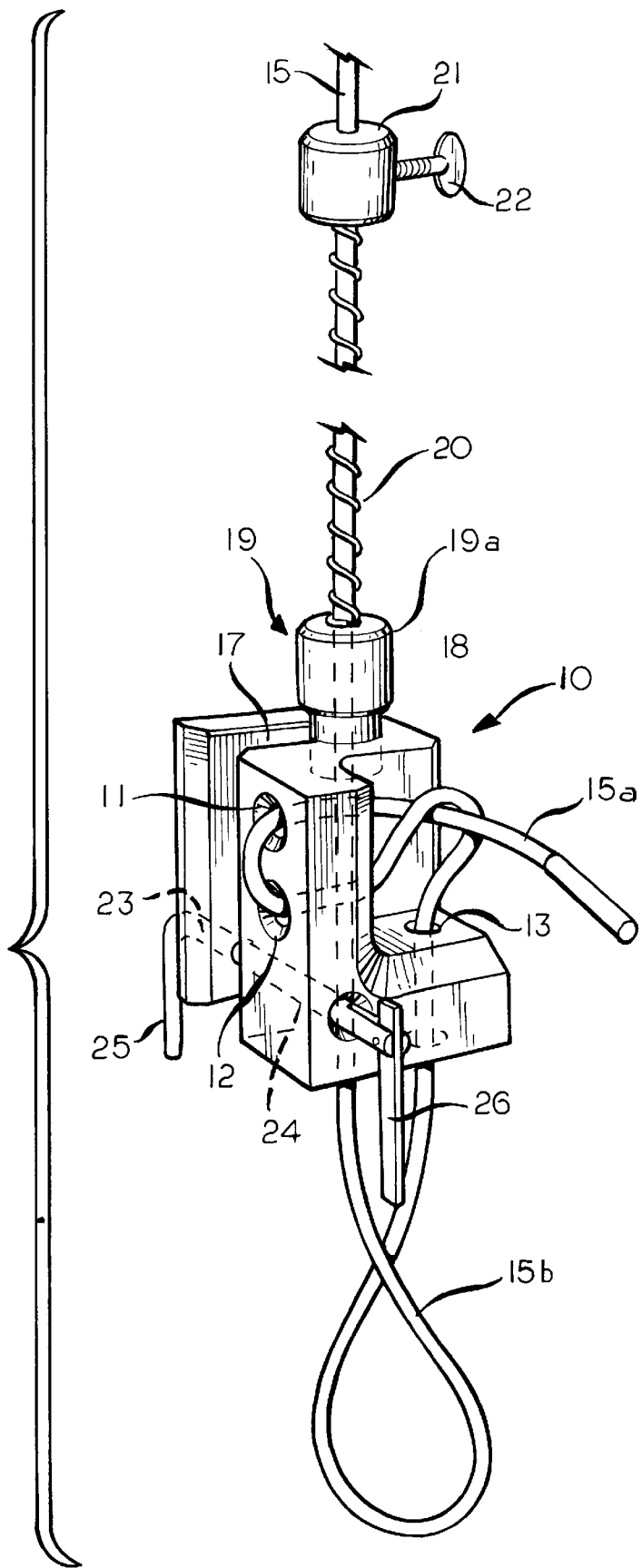
FIG. 1 is a perspective view of the cable knot block device of the present invention.

With reference to the drawings, FIG. 1 shows a cable knot block device 10 comprised basically of a rectangular steel body member which has a plural series of three (3) spaced-apart similar holes 11, 12 and 13 for receiving the terminating free end portion 15a of a steel cable 15. The cable 15 is preferably comprised of multi-strand steel wires ranging in overall cable diameter commonly from about $3/16$ to $1/2$ inch. Obviously, the device can be made larger to receive and connect to any larger size cable.

Holes 11 and 12 are formed in parallel spaced-apart array in one side of the block 10 normal to the overall longitudinal axis of the block. A third hole 13 is formed in an adjacent L-shaped area of the block normal to the pair of parallel holes 11 and 12. All three holes 11, 12 and 13 have a similar diameter slightly greater than the cable diameter for easy passage of the cable therethrough. As shown in FIG. 1, the cable 15 is threaded through the three holes and cross-tied to affix the cable end 15a to the block. Preferably, the cable end 15a is first looped upwardly through hole 13 and then through parallel holes 11 and 12, and through the formed loop for permanent fixation of the cable to the block.

Figure 2:
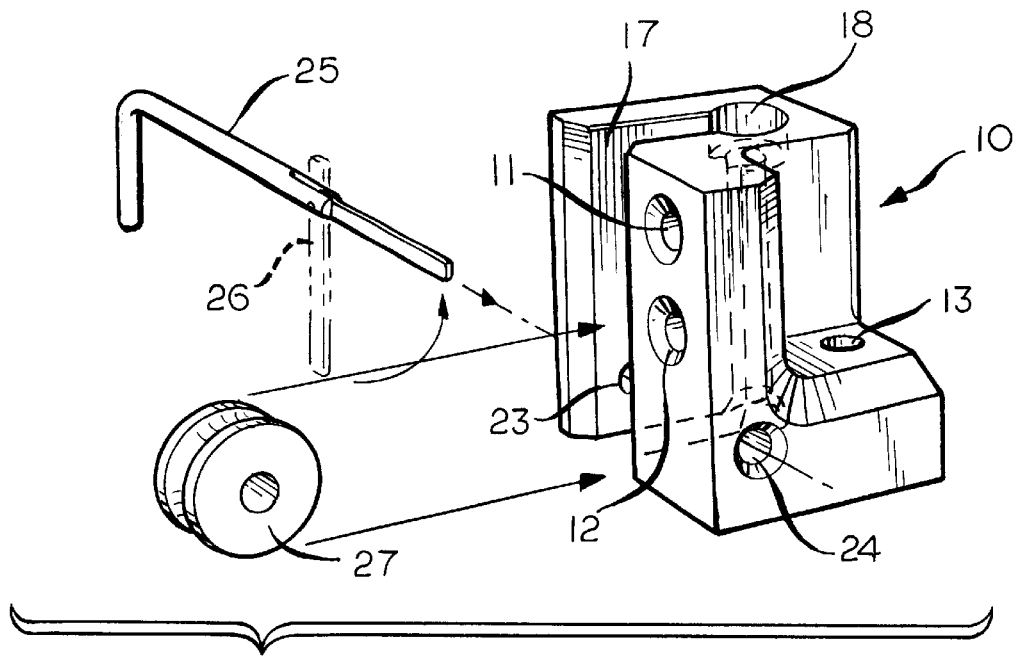
FIG. 2 is an exploded view of another embodiment of the knot block device shown in FIG. 1 without the cable.

The cable 15 is then used to form the looped portion 15b of the cable as shown in FIG. 1, the loop being properly sized to surround the designated load. The cable is then drawn upwardly through a continuous lineal slot 17 in the block, the slot having a width slightly greater than the cable diameter. FIGS. 1 and 2 show the slot for receiving the cable. The upper end of slot 17 has an enlarged circular recess 18 as shown in FIG. 2 adapted to receive a round keeper member 19 which fits slidably in the recess 18. Keeper member 19 has an enlarged upper end 19a having a greater diameter than circular recess 18. The cable 15 is passed upwardly through keeper member 19 after being placed in the slot 17.

An upper portion of the cable above member 19 is surrounded by a spring member 20 placed around the cable above the keeper member 19. A locking ring or ferrule 21 is placed around the cable above the spring 20 as shown in FIG. 1. The ferrule 21 has a thumb screw member 22 in one side thereof which is able to be tightened on the cable after some compression is placed on the spring 20 and the underlying keeper member 19, to maintain the latter tightly in place. In the alternative, an L-shaped wedging metallic ring having a hole in one arm to surround the cable and a short arm to engage the spring with the other arm to keep pressure on the spring may be used instead of the metallic ferrule.

With the cable loop 15b drawn tightly around the load for hoisting and the cable affixing keeper members 19, 20 and 21 in place, the cable is maintained in the slot 17 so that when the cable is placed under load, or tension on the cable is relaxed or reduced, the cable remains firmly attached to the device and load for moving or restraining of the load. Also, the spring is able to place increased tension in the cable under load to increase the loop holding pressure.

The block device 10 has a pair of juxtaposed holes in its lower portion designated by numerals 23 and 24 outbound from opposite sides of the slot 17 to receive a rigid L-shaped cross pin 25 for further retention of the cable in the slot 17. The pin 25 has a pivoted cross arm 26 mounted near one end portion to extend beyond block 10 for swingable outward movement to ensure that the cable remains in the slot 17 when the pin 25 is mounted in its opposing mounting holes. Thus, the cable cannot escape from the slot at any time during lifting.

Figure 3:
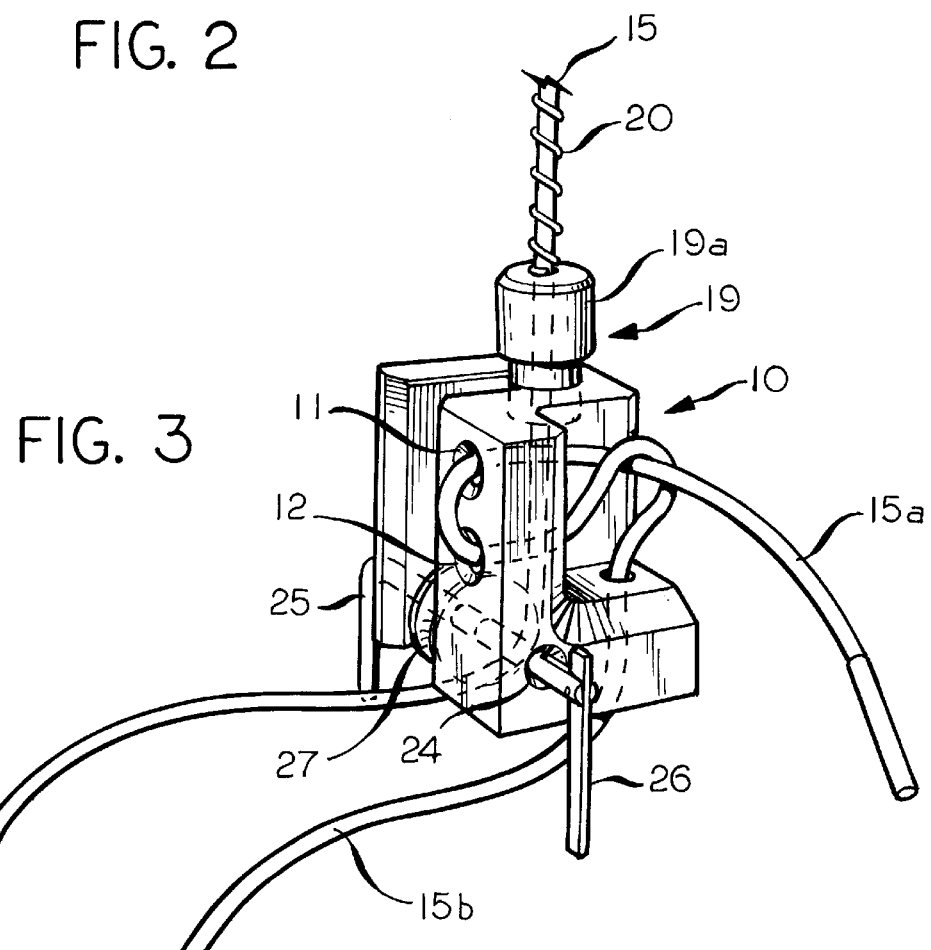
FIG. 3 is a perspective view of another embodiment of the device shown in FIG. 2 mounted on a cable end.
Figure 4:
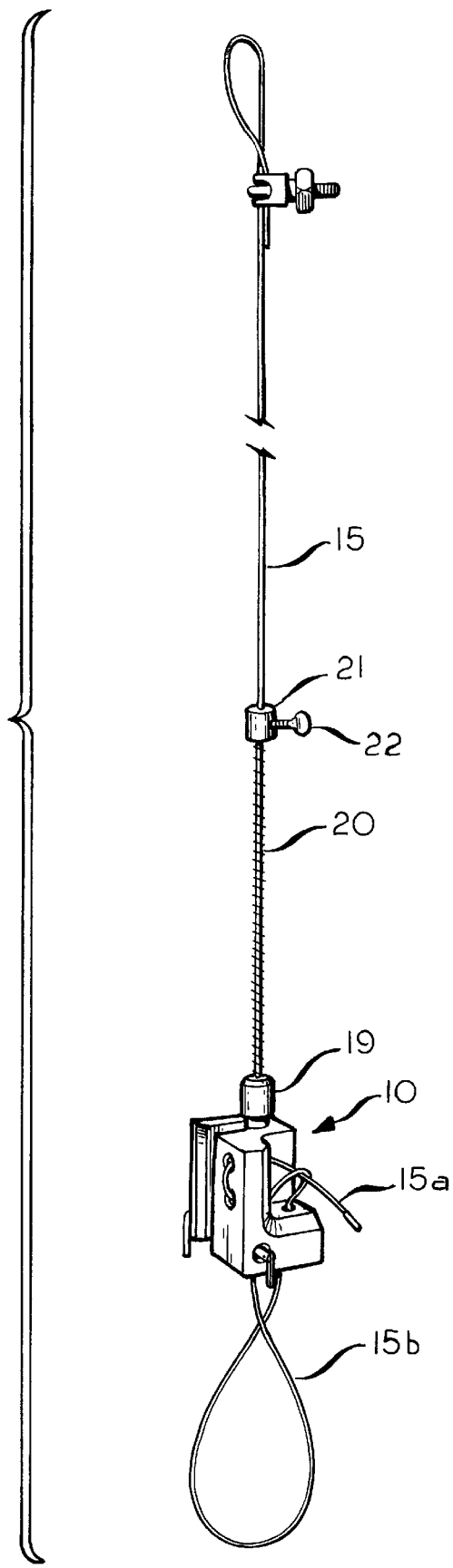
FIG. 4 is a perspective view of the knot block device shown in FIG. 1 with a lengthy spring mounted on a lengthy cable having a closed loop second end.

In the embodiment of the invention shown in FIGS. 2 and 3, a roller member 27 having a circular recess in its outer surface is placed in the slot 17 mounted on pin 25 for free rotation thereon. The cable is further maintained in the slot 17 by the roller 27 even when the cable loop 15b and the load are turned at 90 degrees or to a lesser angle from the block longitudinal axis. Regardless of the angle of the looped portion of the cable under load, the block or its slot is not placed under point loading, but the load is placed on the cable and distributed thereover and not placed on any localized point-loaded portion of the block. Thus, the load is placed entirely on the cable and only limited by its tensile strength.

Usage of the subject device where only one free end of the cable is available, such as where the major portion of the cable is wrapped around a winch or cable drum, is initiated by firstly, mounting ring or ferrule member 21 on the cable free end, secondly, placing the spring member 20 on the cable free end, and thirdly, placing the keeper member 19 on the cable free end prior to attaching the knot block 10 with the cable in the slot 17. The free end is then wound through the end retention holes 11, 12 and 13 as aforesaid.

The device is especially useful for placing the looped end portion 15b of the cable around a heavy load resting at an odd angle substantially removed from vertical, and placing the cable within the slot portion of the device, affixing the keeper members 19, 20 and 21 to the cable, if a second free end is available, and placing transverse pin 25 in the slot 17 in proper relation to the cable, and then lifting and/or moving the load as desired. This is particularly useful in attaching the cable loop to plural grouped articles such as metal pipes lying in adjacent horizontal relation or in a confined space, or alternately, under water.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention are by way of example, and the scope of the invention is not limited to the exact details shown or described.

Various modifications may be resorted to within the spirit and scope of the appended claims.

I claim:

1. A cable retaining device for forming a cable loop around an article to be lifted or restrained, said device comprising, in combination, a cable having at least one free end, a cable knot block having a generally rectangular shape, a pair of similar parallel holes in an upper region of said block, a third hole in said block located at right angles to said pair of parallel holes, all said holes having a slightly greater diameter than the cable diameter adapted to receive the free end portion of said cable in fixed relation, a continuous lineal slot in said block formed parallel to said third hole to receive an intermediate portion of said cable beyond a sized lifting loop, said slot having a slightly greater width than said cable diameter, an enlarged recessed circular area formed in an upper terminating region of said slot, and a circular keeper member surrounding said cable fitted within said enlarged recessed area of said slot for positive retention of said cable therein.

2. The cable retaining device in accordance with claim 1, including a spring member surrounding a portion of said cable above said keeper member and a ferrule member surrounding said cable mounted at the other end of said spring member.

3. The cable retaining device in accordance with claim 2, wherein said ferrule member includes locking means to maintain compression on said spring member for positive fixed retention of said cable in looped relation.

4. The cable retaining device in accordance with claim 3, wherein said locking means comprises a thumb screw adapted to engage said cable in positive relation.

5. The cable retaining device in accordance with claim 1, wherein the said cable is comprised of multi-strand steel cable having a diameter preferably ranging from about 3/16 to 1/2 inch or greater.

6. The cable retaining device in accordance with claim 1, wherein the said block has a pair of juxtaposed holes at its other end opposite from its enlarged recessed circular area to receive a rigid pin for further retention of said cable in said continuous slot.

7. The cable retaining device in accordance with claim 1, including a roller member located in one end of said continuous slot opposite from said enlarged recessed circular area to permit essentially right-angled loading of said looped portion of said cable without point loading thereof.

8. A cable retaining device for forming a cable loop around an article to be lifted or restrained, said device comprising, in combination, a cable having at least one free end, a cable knot block having a generally rectangular shape, a pair of similar parallel holes in an upper region of said block normal to its longitudinal axis, a third hole in said block disposed at right angles to said pair of parallel holes, all said holes having a slightly greater diameter than the cable diameter adapted to receive the said free end portion of said cable in cross-tied relation, a continuous lineal slot in said block formed parallel to said third hole to receive an intermediate portion of said cable beyond a sized lifting loop, said slot having a slightly greater width than said cable diameter, an enlarged recessed circular area formed in an upper terminating region of said slot, and circular keeper means surrounding said cable located within said enlarged recessed area of said slot for firm retention of said cable within said slot.

9. The cable retaining device in accordance with claim 8, including a spring member surrounding a portion of said cable above said keeper means and a ferrule member surrounding said cable mounted at the other end of said spring member.

10. The cable retaining device in accordance with claim 9, wherein said ferrule member includes locking means to maintain compression on said spring member.

* * * * *